A. L. CASE.
TIRE CASING AND METHOD OF MANUFACTURE.
APPLICATION FILED APR. 25, 1917.
1,298,661. Patented Apr. 1, 1919.
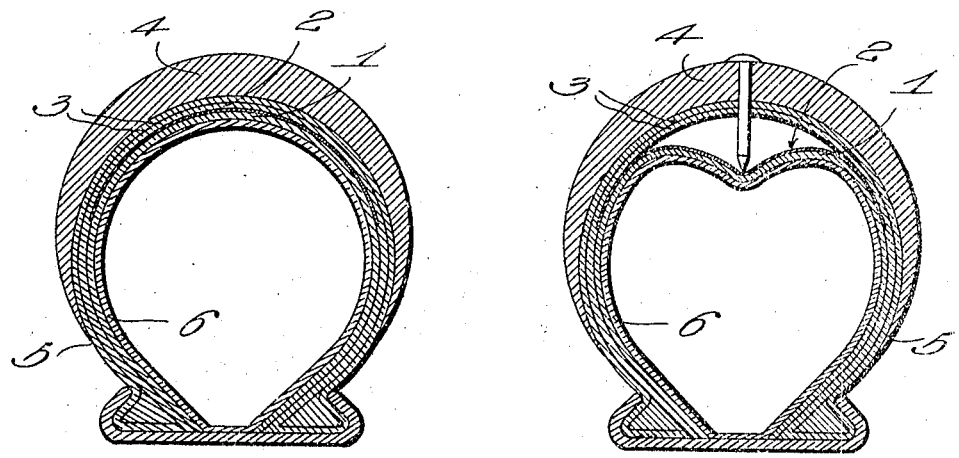
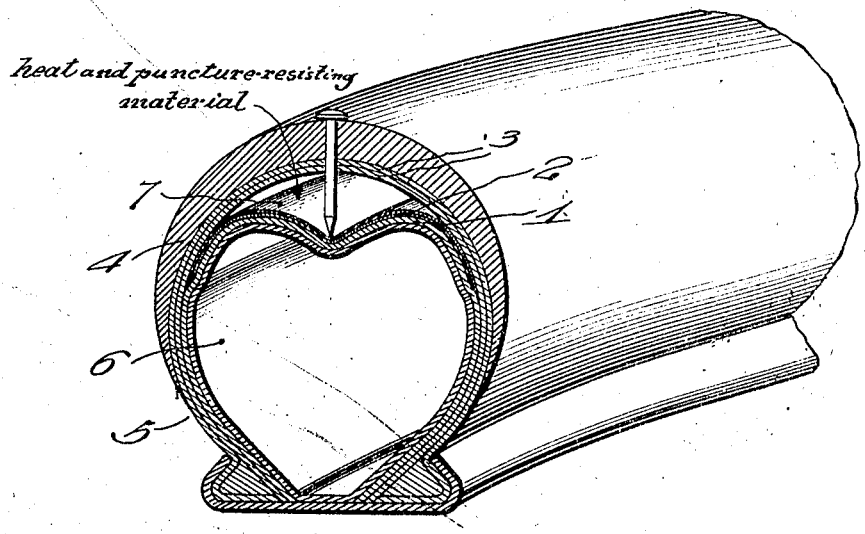

UNITED STATES PATENT OFFICE.

ARTHUR LYNN CASE, OF PLAINFIELD, NEW JERSEY.

TIRE-CASING AND METHOD OF MANUFACTURE.

1,298,661. Specification of Letters Patent. Patented Apr. 1, 1919.

Application filed April 25, 1917. Serial No. 164,444.

*To all whom it may concern:*

Be it known that I, ARTHUR L. CASE, a citizen of the United States, residing at Plainfield, in the county of Union and State of New Jersey, have invented certain new and useful Improvements in Tire-Casings and Methods of Manufacture; and I do declare the following to be a full, clear, and exact description of the invention, such as will enable others skilled in the art to which it appertains to make and use the same.

The object of my invention is to provide a novel form of tire casing and method of making the same, whereby the danger of puncture is reduced to a minimum, and whereby the heating of the casing from the running contact thereof with the roadway is also minimized.

With the foregoing general object in view, the invention resides in the method and construction hereinafter fully described and claimed, the descriptive matter being supplemented by the accompanying drawing which constitutes a part of this application and in which:

Figure 1 is a vertical transverse section of a casing, showing one form of the invention;

Fig. 2 is a duplicate of Fig. 1 with the exception that it illustrates the manner in which the casing is affected by the passage of a nail or the like through the tread of the tire; and Fig. 3 is a sectional perspective illustrating a different form of the invention.

In the manufacture of the improved tire, one or more of the inner fabric layers 1 of the carcass are built up in the usual manner and a band 2 of Holland fabric or other flexible nonvulcanizable material is applied to the outer tread portion of said layer or layers as shown clearly in Figs. 1 and 2. The band 2 is preferably gummed to the layer 1 with which it contacts and said band may be constructed in separate sections or in one piece as occasion may demand, and may be of any suitable width. In most cases, the band 2 preferably occupies about one-third of the cross sectional circumference of the casing.

When constructing the tire as shown in Figs. 1 and 2, the other layers 3 of the carcass are applied after proper positioning of the band 2, after which the tread 4 and the usual rubber sides 5 are added, the entire casing being then vulcanized so that the several layers 1 and 2 of fabric will adhere to each other in the usual manner. The strip of Holland fabric or the like, however, will not vulcanize to the layer 3 with which it contacts and thus the tread portions of the inner layers 1 will remain disconnected from the corresponding portions of the other layers 3, whereby said tread portions of the layers 1 are free to move inwardly and compress the inner tube 6 when a nail or the like passes through the tread 4 and the layers 3. By leaving the inner layers of the carcass free to move in this manner, danger of puncture is reduced to a minimum.

In the form of the invention illustrated in Fig. 3, a strip or band 7 of asbestos fiber or other preferred material is applied to the outer surface of the Holland fabric 2, before the tire is completed as described, it being the office of the material 7 to insulate the inner portion of the casing from the tread thereof and to prevent nails or the like from passing through the layers 1 of the inner tube. It will thus follow that the heat generated by the running contact of the tread with the roadway, will not be conducted to the other parts of the casing as readily as in the forms of tires now in use. The puncture resisting qualities of the casing shown in Fig. 3 are even greater than that illustrated in Figs. 1 and 2 on account of the added thickness of the fiber 7 or other appropriate material which may be employed. I wish it understood that I may employ any suitable material at 7 which will tend to resist the entrance of nails, sharp stones or the like which may succeed in passing through the tread portion of the tire and this material may or may not be of a nature to prevent the passage of heat from the tread surface to the interior of the tire.

While in the present embodiment of the invention I have shown the layers 1 as a part of the usual carcass of an ordinary tire, I wish it understood that I do not restrict myself to this integral construction or formation of the loose layers 1 with the tire carcass since such loose layers may be separately formed and attached permanently to the interior of the tire at or near the bead portion thereof in any suitable manner. It will also be observed that in the preferred forms which I have illustrated, that is, in which the inner loose layers are formed as a part of the ordinary carcass, no extra material is needed in making my improved tire and there will be no diminution in the strength of the tire because the loose layers will normally be in contact with the outer tread section and the strength of the side walls is therefore not decreased. It is to be further noted that in the formation of this tire no special apparatus need be used since it can be made on the tire forms now employed in making the standard constructions.

While I have illustrated the forms of the invention which I prefer at the present time, it is to be understood that within the scope of my invention as claimed, numerous minor changes may be made without sacrificing the main advantages; the principal feature being the loose inner member which will yield inwardly when engaged by a nail or the like that passes through the tire tread, such loose portion being permanently attached around its side edges to the side walls of the tire casing.

I claim:

1. A tire casing comprising a carcass consisting of a plurality of layers of fabric, a tread of rubber cured on said carcass, one or more of the inner layers of said carcass being disconnected from the other layers substantially throughout the width of the tire tread to permit said layer or layers to move inwardly and compress the tube when a nail or the like passes through the tread of the casing, a band of flexible non-vulcanizable material in contact with the tread portion of said inner layer or layers of the carcass, and a band of heat resisting material interposed between said first named band and the outer layers of the carcass.

2. The method of constructing a tire casing consisting in applying one or more inner layers of the fabric carcass, applying a band of flexible non-vulcanizable material to the outer tread portion of said layer or layers, in completing the carcass by applying outer fabric layers, applying the rubber tread and sides, and vulcanizing the complete casing.

3. In a tire casing, a carcass consisting of a pair of beads, an inner series of fabric plies extending uninterruptedly from one bead to the other and vulcanized together, and an outer series of plies vulcanized together and also extending uninterruptedly from one bead to the other, said inner and outer series being vulcanized together with the exception of their tread portions, and said portions being entirely disconnected to permit the inner plies to yield inwardly upon passage of a sharp object through the outer plies, and a tread vulcanized on said outer plies.

In testimony whereof I have hereunto set my hand.

ARTHUR LYNN CASE.